United States Patent [19]

Ovshinsky et al.

[11] Patent Number: 5,348,822
[45] Date of Patent: Sep. 20, 1994

[54] CHEMICALLY AND COMPOSITIONALLY MODIFIED SOLID SOLUTION DISORDERED MULTIPHASE NICKEL HYDROXIDE POSITIVE ELECTRODE FOR ALKALINE RECHARGEABLE ELECTROCHEMICAL CELLS

[75] Inventors: Stanford R. Ovshinsky, Bloomfield Hills; Dennis Corrigan, Troy; Srini Venkatesan, Southfield; Rosa Young; Christian Fierro, both of Troy; Michael A. Fetcenko, Rochester Hills, all of Mich.

[73] Assignee: Ovonic Battery Company, Inc., Troy, Mich.

[21] Appl. No.: 27,973

[22] Filed: Mar. 8, 1993

Related U.S. Application Data

[63] Continuation-in-part of Ser. No. 975,031, Nov. 12, 1992.

[51] Int. Cl.$^5$ .......................... H01M 4/32; B22F 1/00
[52] U.S. Cl. .................................. 429/223; 428/550; 428/570; 428/680; 428/457; 419/53; 429/101; 429/188; 429/193; 429/194; 429/68; 252/181.6; 252/182.11; 252/182.33
[58] Field of Search ............... 429/101, 194, 188, 193, 429/223, 68; 419/53; 252/182.11, 181.6, 182.33

[56] References Cited

U.S. PATENT DOCUMENTS

| | | | |
|---|---|---|---|
| 4,064,332 | 12/1977 | Elfwing et al. | 429/223 |
| 4,551,400 | 11/1985 | Sapru et al. | 429/94 |
| 4,623,579 | 11/1986 | Sapru et al. | 429/101 |
| 4,696,875 | 9/1987 | Glemser et al. | 429/206 |
| 4,728,586 | 3/1988 | Venkatesan et al. | 429/94 |
| 4,844,948 | 7/1989 | Nakahori et al. | 429/223 X |
| 4,975,035 | 12/1990 | Kuklinski et al. | 429/223 X |
| 4,985,318 | 1/1991 | Oshitane et al. | 429/223 |
| 5,096,667 | 3/1992 | Fetcenko | 429/101 X |
| 5,132,177 | 7/1992 | Kawano et al. | 429/206 |

*Primary Examiner*—Floyd D. Higel
*Attorney, Agent, or Firm*—Marvin S. Siskind; Marc J. Luddy; Dave W. Schumaker

[57] ABSTRACT

A high capacity, long cycle life positive electrode for use in an alkaline rechargeable electrochemical cell comprising: a solid solution nickel hydroxide material having a multiphase structure that comprises at least one polycrystalline γ-phase including a polycrystalline γ-phase unit cell comprising spacedly disposed plates with at least one chemical modifier incorporated around the plates, the plates having a range of stable intersheet distances corresponding to a 2+oxidation state and a 3.5+, or greater, oxidation state; and at least one compositional modifier incorporated into the solid solution nickel hydroxide material to promote the multiphase structure.

22 Claims, 4 Drawing Sheets

CHEMICALLY AND COMPOSITIONALLY MODIFIED SOLID SOLUTION DISORDERED MULTIPHASE NICKEL HYDROXIDE POSITIVE ELECTRODE FOR ALKALINE RECHARGEABLE ELECTROCHEMICAL CELLS

CONTINUING INFORMATION

This application is a continuation-in-part of U.S. patent application Ser. No. 07/975,031 filed Nov. 12, 1992.

FIELD OF THE INVENTION

The present invention relates generally to an optimized nickel hydroxide positive electrode. More specifically, this invention relates to a disordered multiphase nickel hydroxide positive electrode material having at least one polycrystalline γ-phase for rechargeable alkaline cells formed by the incorporation of a compositional and/or chemical modifier. This material exhibits multiple electron transfers.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

The best rechargeable alkaline cells are ones that can operate as an "install and forget" power source. With the exception of periodic charging, a rechargeable alkaline cell should perform without attention and should not become a limiting factor in the life of the device it powers.

There are many known types of Ni based cells such as nickel cadmium ("NiCd"), nickel metal hydride ("Ni-MH"), nickel hydrogen, nickel zinc, and nickel iron cells. NiCd rechargeable alkaline cells are the most widely used although it appears that they will be replaced by Ni-MH cells. Compared to NiCd cells, Ni-MH cells made of synthetically engineered materials have superior performance parameters and contain no toxic elements.

In a NiCd cell, cadmium metal is the active material in the negative electrode. NiCd cells use a positive electrode of nickel hydroxide material. The negative and positive electrodes are spaced apart in the alkaline electrolyte. Upon application of an electrical potential across the materials of a NiCd cell, the negative electrode undergoes the reaction shown in equation (1):

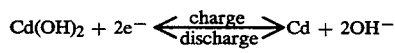
(1)

During discharge, this reaction is reversed, Cd is oxidized to Cd(OH)2 and electrons are released. The reactions that take place at the positive electrode of a Ni-Cd cell are also reversible. For example, the reactions at a nickel hydroxide positive electrode in a nickel cadmium cell are shown in equation (2):

(2)

In general, Ni-MH cells utilize a negative electrode that is capable of the reversible electrochemical storage of hydrogen. Ni-MH cells also usually employ a positive electrode of nickel hydroxide material. The negative and positive electrodes are spaced apart in the alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation (3):

(3)

The negative electrode reactions are reversible. Upon discharge, the stored hydrogen is released to form a water molecule and release an electron. The reactions that take place at the nickel hydroxide positive electrode of a Ni-MH cell are shown in equation (4):

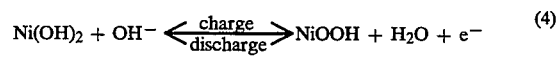
(4)

This is the identical reaction that occurs in a NiCd cell. Similar equations can be written for the other known types of alkaline cells that use nickel based negative electrode materials.

Ni-MH are classified based on the negative electrode material. Early references refer to Ni-MH cells as $AB_2$ based material or $AB_5$ (mischmetal) based material. It is now realized that both $AB_2$ and $AB_5$ materials can be multiphase multicomponent materials in which case they are called Ovonic materials. Ni-MH materials are discussed in detail in copending U.S. patent application Ser. No. 07/934,976 to Ovshinsky and Fetcenko, and now U.S. Pat. No. 5,277,999 the contents of which are incorporated by reference.

The first hydrogen storage alloys to be investigated as battery electrode materials were TiNi and $LaNi_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of problems such as slow discharge, oxidation, corrosion, poor kinetics, poor catalysis, and poor cycle life. The initial use of these simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and $LaNi_5$ systems.

The modification of TiNi and $LaNi_5$ was initiated by Stanford R. Ovshinsky at Energy Conversion Devices (ECD) of Troy, Mich. Upon a detailed investigation, Ovshinsky and his team at ECD showed that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidentally and were not designed into the bulk of the material. Thus, the efficiency of the storage of hydrogen and the subsequent release of hydrogen to form water was determined to be substantially less than that which would be possible if a greater number and variety of active sites were available. By engineering a disordered material having an ordered local environment, the entire bulk of the material can be provided with catalytically active hydrogen storage sites. Ovshinsky had previously found that the number of surface sites could be increased by making an amorphous film that resembled the surface of the desired relatively pure materials. As Ovshinsky explained in Principles and Applications of Amorphicity, Structural Change, and Optical Information Encoding, 42 Journal De Physique at C4-1096 (October 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . . . Once amorphicity was understood as a means of introducing surface sites in a film, it was possible to produce "disorder" that takes into account the entire spectrum of local order effects such as porosity, topology, crystallites, characteristics of sites, and distances between sites.

Thus, rather than searching for material modifications that would yield ordered materials having a maximum number of accidently occurring surface irregularities, Ovshinsky and his team at ECD began constructing "disordered" materials where the desired irregularities were synthetically engineered and tailor made. See, U.S. Pat. No. 4,623,597, the disclosure of which is incorporated by reference. The term "disordered," as used herein corresponds to the meaning of the term as used in the literature, such as the following:

> [Disordered material] can exist in several structural states. This structural factor constitutes a new variable with which the physical properties of the [material] . . . can be controlled. Furthermore, structural disorder opens up the possibility of preparing in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . . S. R. Ovshinsky, The Shape of Disorder, 32 Journal of Non-Crystalline Solids at 22 (1979).

The "short-range order" of disordered materials is explained further by Ovshinsky in The Chemical Basis of Amorphicity: Structure and Function, 26:8-9 Rev. Roum. Phys. at 893-903 (1981):

> [S]hort-range order is not conserved . . . . Indeed, when crystalline symmetry is destroyed, it becomes impossible to retain the same short-range order. The reason for this is that the short-range order is controlled by the force fields of the electron orbitals. Therefore, the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . . .

Short-range, or local, order is elaborated on in U.S. Pat. No. 4,520,039 to Ovshinsky, entitled Compositionally Varied Materials and Method for Synthesizing the Materials, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al. The materials of the '400 Patent are generally multiphase materials, which may contain, but are not limited to, one or more phases of Ti—V—Zr—Ni material with $C_{14}$ and $C_{15}$ type crystal structures. Other Ti—V—Zr—Ni alloys may also be used for fabricating rechargeable hydrogen storage negative electrodes. One such family of materials are those described in U.S. Pat. No. 4,728,586 ("the '586 Patent") to Venkatesan, Reichman, and Fetcenko for Enhanced Charge Retention Electrochemical Hydrogen Storage Alloys and an Enhanced Charge Retention Electrochemical Cell, the disclosure of which is incorporated by reference. The '586 Patent describes a specific sub-class of these Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V—Ti—Zr—Ni family of alloys described in the '586 Patent has an inherently higher discharge rate capability than previously described alloys. This is the result of substantially higher surface areas at the metal/electrolyte interface for electrodes made from the V—Ti—Zr—Ni materials. The surface roughness factor (total surface area divided by geometric surface area) of the V—Ti—Zr—Ni is about 10,000. This value indicates a very high surface area. The validity of this value is supported by the inherently high rate capability of these materials.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

In contrast to the V—Ti—Zr—Ni based alloys described above, the early $AB_5$ alloys are ordered materials that have a different chemistry and microstructure, and exhibit different electrochemical characteristics compared to the V—Ti—Zr—Ni based alloys. However, recent analysis reveals while the early $AB_5$ alloys may have been ordered materials, more recently developed $AB_5$ alloys are not. The performance of the early ordered $AB_5$ materials was poor. However, as the degree of modification increased (that is as the number and amount of elemental modifiers increased) the materials became disordered, and the performance of the $AB_5$ alloys began to improve significantly. This is due to the disorder contributed by the modifiers as well as their electrical and chemical properties. This evolution of $AB_5$ type alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395: (iv) U.S. Pat. No. 4,107,405; (v) U.S. Pat. No. 4,112,199; (vi) U.S. Pat. No. 4,125,688; (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference.)

Simply stated, in the $AB_5$ alloys, like the V—Ti—Zr—Ni alloys, as the degree of modification increases, the role of the initially ordered base alloy is of minor importance compared to the properties and disorder attributable to the particular modifiers. In addition, analysis of the current multiple component $AB_5$ alloys indicates that current AB₅ alloy systems are modified following the guidelines established for V—Ti—Zr—Ni based systems. Thus, highly modified AB₅ alloys are identical to V—Ti—Zr—Ni based alloys in that both are disordered materials that are characterized by multiple-components and multiple phases and there no longer exists any significant distinction between multi-component, multiphase V—Ti—Zr—Ni based alloys and AB₅ alloys.

Rechargeable alkaline cells can be either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is with only the minimum amount of electrolyte necessary to permit gas recombination. The enclosure for a sealed cell is normally metallic and the cell may be designed for operation at up to about 100 p.s.i. absolute or higher. Because they are sealed, such cells do not require periodic maintenance.

Typically, a sealed rechargeable alkaline cell for use in consumer appliances, such as a C cell, uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a NiCd negative electrode and a Ni—MH negative electrode are both provided in excess, to maintain the optimum capacity and provide overcharge protection.

The operational lifespan, that is, the available number of charge and discharge cycles of a sealed cell, typically determines the kinds of applications for which a cell will be useful. Cells that are capable of undergoing more cycles have more potential applications. Thus, longer lifespan cells are more desirable.

An additional goal in making any type of electrode is to obtain as high an energy density as possible. For small batteries, the volume of a nickel hydroxide positive electrode is more important than weight and the energy density is usually measured in mAh/cc, or an equivalent unit.

At present, sintered, foamed, or pasted nickel hydroxide positive electrodes are used in NiCd and Ni-MH cells. The process of making sintered electrodes is well known in the art. Conventional sintered electrodes normally have an energy density of around 480–500 mAh/cc. In order to achieve significantly higher loading, the current trend has been away from sintered positive electrodes and toward foamed and pasted electrodes that can be manufactured with an energy density of about 600 mAh/cc.

In general, sintered positive electrodes are constructed by applying a nickel powder slurry to a nickel-plated steel base followed by sintering at high temperature. This process causes the individual particles of nickel to weld at their points of contact resulting in a porous material that is approximately 80% open volume and 20% solid metal. This sintered material is then impregnated with active material by soaking it in an acidic solution of nickel nitrate, followed by conversion to nickel hydroxide by reaction with an alkali metal hydroxide. After impregnation, the material is subjected to electrochemical formation.

In rechargeable alkaline cells using a nickel hydroxide positive electrode, the nickel hydroxide changes back and forth between Ni(OH)₂ and NiOOH as the cell is charged and discharged (see, equations (2) and (4), above). FIG. 1 is Bode et al.'s presentation of the relationship between the different structural phases that occur in such an electrode as presented in 11 Electrochem. Acta 1079 (1966). These structures represent plates of crystallized nickel hydroxide positive electrode material held in position by a variety of ionic species. In unmodified nickel hydroxide electrode materials cycling occurs from the $\beta(II)phase \rightleftharpoons \beta(III)$ phase structures because they are the most stable. During such cycling one electron is transferred. The theoretical specific capacity of the nickel hydroxide active material based on this reaction is 289 mAh/g.

In contrast to $\beta$-phase cycling, $\alpha \rightleftharpoons \gamma$, phase cycling appears to involve the transfer of at least 1.5 electrons. (See, for example, Oliva et al., 8 J. Power Sources 229 (1982)). Such multiple electron transfer would, of course, lead to a higher cell capacity. Corrigan and Knight, report in 136 J. Electrochem. Soc. 613 (1989)) that the oxidation of $\alpha$-Ni(OH)₂ can proceed in a 1.7 electron oxidation to K(NiO₂)₃ with a nickel valence of 3.67 according to equation (5):

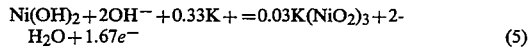

$$Ni(OH)_2 + 2OH^- + 0.33K^+ = 0.03K(NiO_2)_3 + 2H_2O + 1.67e^- \qquad (5)$$

However, they do not show how to produce stable $\gamma$-phase materials.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction to nickel hydroxide adjacent the current collector forms a less conductive surface that interferes with the subsequent reduction of oxidized active that is farther away.

Cobalt has also been reported as capable of stabilizing $\alpha$-Ni(OH)₂ materials and thus its presence appears to be helpful in facilitating multiple electron transfers. For example, Delmas, et al., reported in Proceedings of the Symposium on Nickel Hydroxide Electrodes 118–133 (1990) that substituting at least 20% trivalent cobalt for nickel stabilized α phase material resulted in the incorporation of Co into the nickel hydroxide plates material with a subsequent intercalation of anions (such as $CO_3^{2-}$, $SO_4^{2-}$, $NO_4^{-}$, or $OH^{-}$) and water between the plates of nickel hydroxide (see, FIG. 2 [Delmas FIG. 7, page 118]). More specifically, Delmas, et al.'s analysis and conclusion is based on crystalline nickel hydroxide materials prepared using the "chimie douce" method. Delmas, et al., later report in B13 Materials Science and Engineering 89–96 (1992) that cobalt stabilized "chimie douce" materials at the beginning of cycling would reversibly transfer 1.3 electrons per atom (Ni+Co) in cycling from the $\alpha \rightleftharpoons \gamma$-phase, but that during extended cycling a gradual change from the $\alpha/\gamma$ system to the $\beta(II)/\beta(III)$ system was observed. This indicates instability of the $\alpha/\gamma$ transition.

The materials described by Delmas and his coworkers have a number of drawbacks:

(1) The stability of these materials over the long term appears to be a problem.
(2) The gain in electrode specific capacity is limited to less than 1.5 electrons per nickel atom transferred in the charge storage reaction and a high percentage of inactive materials.
(3) The chimie douce materials are crystalline materials that Delmas specifically distinguishes from coprecipitated cobalt modified nickel hydroxide materials that are routinely prepared.
(4) These materials use a high concentration of cobalt (20%).
(5) The methods cited by Delmas to achieve γ-phase materials are impractical, unreliable, and expensive.

More recently, zinc and cadmium (see, the discussion of U.S. Pat. No. 5,077,149, in copending U.S. Pat. No. 07/975,031, the contents of which are incorporated by reference) have been incorporated together with cobalt into the crystalline matrix of nickel hydroxide. These elements are thought to improve battery performance primarily by minimizing swelling of the electrode materials, and improving operation at high temperature.

The functions of the known modifiers to nickel hydroxide (Co, Zn, and Cd) are generally quite clear, but not identical. Cobalt is usually added to nickel hydroxide at a level of 0–5% in commercial applications. This level of cobalt is used to improve the speed of activation, increase resistance to poisons, and marginally improve capacity. Delmas observed that much higher capacity could result if 20% cobalt were used, although the effect was not stable and not applicable to practical systems. It is generally believed that the major reason the cobalt is effective in these areas is through an increase in conductivity within the nickel hydroxide matrix.

On the other hand, Zn and Cd are added to nickel hydroxide to improve cycle life and high temperature operation. The mechanism for these improvements is thought to be related to two functions. Cycle life is extended by decreasing swelling brought on by density changes between the oxidized and reduced states of the nickel hydroxide. Cd and Zn incorporated into the nickel hydroxide reduce the swelling by reducing the difference in density in the charged and discharged condition and increasing the mechanical stability of the nickel hydroxide itself. The exact mechanism is not quite clear, but may be related to improving the ductility of the nickel hydroxide to minimize disintegration and surface area formation. Cd and Zn improve high temperature operation by raising the oxygen overvoltage such that charging efficiency at high temperature is increased, thereby preventing the premature evolution of oxygen that typically occurs from standard nickel hydroxides at high temperature.

Prior art modifications to nickel hydroxide by Co, Zn, and Cd do not address the special requirements of Ni-MH batteries, particularly when Ni—MH batteries are used in electric vehicles. Because Ni-MH negative electrodes have an extremely high storage capacity, the nickel hydroxide positive electrode material is essentially the limiting factor in the overall battery energy density. This makes extending the performance of the nickel hydroxide in all areas more important than in the past. The prior art methods of using 0–5% Cd or Zn to minimize swelling in one electron transfer materials is inadequate to prevent swelling in materials undergoing higher density changes such as those resulting during α to γ-phase transitions. The prior art teaches the use of 0–5% cobalt to improve capacity and utilization. These methods do provide, at best, just slightly more than one electron transfer. (In fact, it is well known to add cobalt to improve utilization in electrodes for many known battery systems where not even one electron transfer can be achieved without the addition of cobalt.) The prior art additionally describes the combinations of cobalt (0–5%), zinc (0–5%), and cadmium (0–5%), but in practical embodiments this provides at best about a one electron transfer and moderate cycle life. The use of radically higher cobalt (20%) and special methods of preparation such as exemplified by Delmas while scientifically interesting are unstable and impractical for actually increasing the numbers of electrons transferred and practically useless in terms the problems encountered in practical embodiments such as cycle life, swelling, conductivity, and operating temperatures.

SUMMARY OF THE INVENTION

One objective of the present invention is a nickel hydroxide electrode capable of multiple electron transfer. Another objective of the present invention is a nickel hydroxide electrode capable of multiple electron transfer that is resistant to swelling. Still another objective of the present invention is the nickel hydroxide electrode capable of multiple electrode transfer throughout its cycle life. Yet another objective of the present invention is a nickel hydroxide electrode capable of multiple electron transfer throughout its life while operating over a wide temperature range.

These and other objectives of the present invention are satisfied by a locally ordered, disordered, high capacity, long cycle life positive electrode for use in an alkaline rechargeable electrochemical cell comprising a solid solution nickel hydroxide electrode material having a multiphase structure and at least one compositional modifier to promote said multiphase structure. This multiphase structure comprises at least one polycrystalline γ-phase including a polycrystalline , γ-phase unit cell comprising spacedly disposed plates with at least one ion incorporated around said plates, said plates having a range of stable intersheet distances corresponding to a 2+ oxidation state and a 3.5+, or greater, oxidation state. The at least one compositional modifier is a metal, a metallic oxide, a metallic oxide alloy, a metal hydride, and/or a metal hydride alloy. Preferably the at least one compositional modifier is chosen from the group consisting of Al, Bi, Co, Cr, Cu, Fe, In, $LaH_3$, Mn, Ru, Sb, Sn, $TiH_2$, TiO, Zn. , More preferably, at least three of these compositional modifiers are used. The at least one chemical modifier incorporated is preferably chosen from the group consisting of Al, Ba, Ca, Co, Cr, Cu, F, Fe, K, Li, Mg, Mn, Na, Sr, and Zn.

The disordered nickel hydroxide electrode material of the present invention includes at least one structure selected from the group consisting of (i) amorphous; (ii) microcrystalline; (iii) polycrystalline lacking long range compositional order; and (iv) any combination of these amorphous, microcrystalline, or polycrystalline structures. A general concept of the present invention is that a disordered active material can more effectively accomplish the objectives of multi-electron transfer, stability on cycling, low swelling, and wide operating temperature than prior art modifications.

The positive electrode material of the present invention comprises reduced nickel hydroxide materials and compositions having improved electronic properties fabricated through a variety of activation methods that result in increased specific conductivity. In these materials, the specific capacity of the nickel hydroxide electrode is substantially increased beyond the conventional 289 mAh/g theoretical specific capacity. This increase in capacity results because these materials exhibit multi-electron transfer involving high valency nickel species. This in turn allows for significant improvements in the specific energies and improved performance in batteries containing the materials of the present invention.

Another significant property of the material of the present invention is not only does it undergo multiple electron transfers, it also is inherently stable during charge-discharge cycling.

Nickel hydroxide material according to the present invention have a discharge capacity well beyond the one-electron capacity of conventional nickel hydroxide materials. This material can be utilized in battery electrodes to provide for substantially increased specific energy in a variety of nickel batteries.

Other aspects of the present invention are satisfied by nickel metal hydride cells containing the disordered positive electrode material described above and an electrolyte comprising at least one element chosen from the group consisting of Ba, Ca, Cs, K, Na, Ra, Rb, and Sr, combined with at least one member of the group consisting of Br, Cl, F, OH.

DETAILED DESCRIPTION OF THE INVENTION

Figure 2:
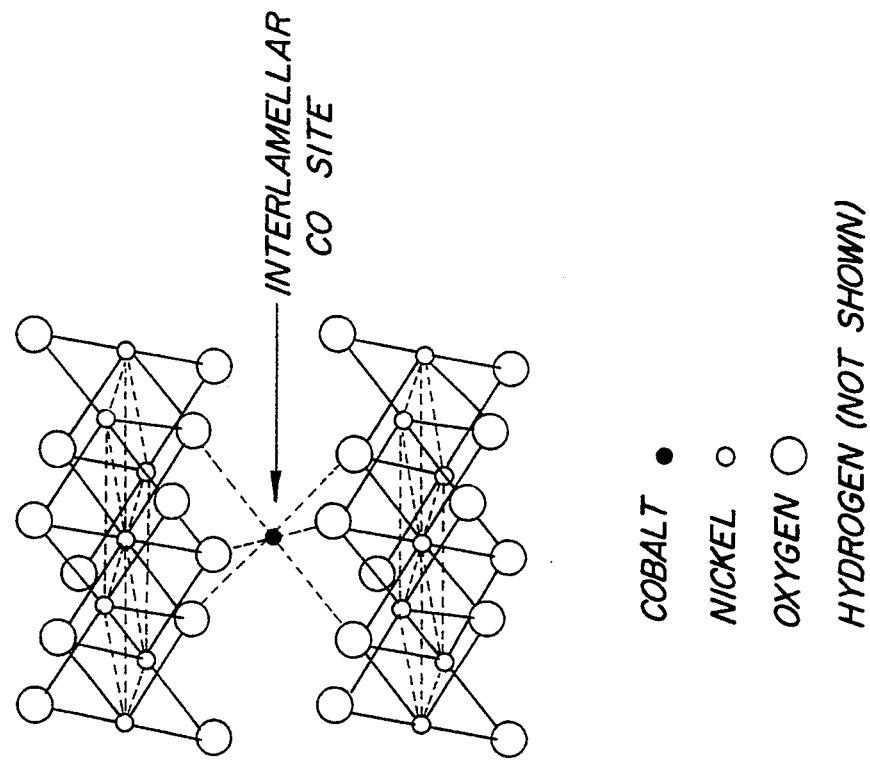
FIG. 2 is a schematic diagram showing the interlamellar placement of cobalt.
Figure 1:
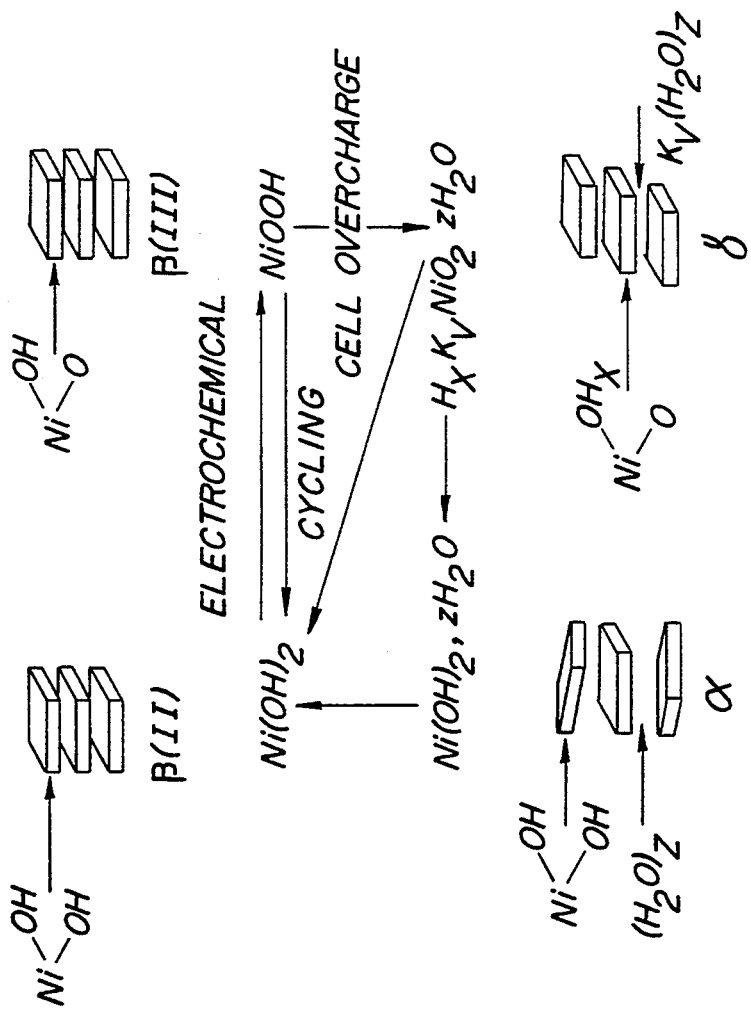
FIG. 1 is Bode's diagram with a schematic representation of the structures of nickel hydroxide.

The improved capacity of the present materials relates to their multiphase disordered structure, $\gamma$-phase stability, multiple electron transfer capabilities, increased conductivity, and their interaction with unique formulated electrolytes. While each of these characteristics are discussed separately, it is believed that they are all interrelated such that improvements, for example, in $\gamma$-phase stability lead to improvements in multiple electron transfer.

The formation of $\gamma$-phase material is desirable because $\gamma$-phase material is capable of multiple electron transfers. Higher capacity batteries using $\gamma$-phase materials have, up until now, not been possible because $\gamma$-phase material could not be stabilized.

In prior art nickel hydroxide materials, cobalt was added to improve stability and encourage multiple electron transfer. It was theorized that cobalt stabilized $\gamma$-phase materials because its presence creates excess positive charge in the nickel hydroxide plates that result in the intercalation of anions, such as $CO_3^{2-}$, and water molecules between the plates to compensate for this excess positive charge. In such material, fractionally more than one electrode is transferred. However, as mentioned above, this effect is short lived.

The positive electrode material described in U.S. Pat. No. 07/975,031 is a disordered active material consisting of a 10% coprecipitated cobalt active material with layers of enriched cobalt substituted on the electrode surface. This material contains a nominal percentage of stabilized $\gamma$-phase material as a result of its disordered microstructure. Building on this work with disordered nickel hydroxide materials, we found that predominantly $\gamma$-phase nickel hydroxide materials that are multiphased could be produced and the stability of the $\gamma$-phase of these materials could be significantly improved. The nickel hydroxide positive electrode materials of the present invention, because of their disordered nature, exhibit stable multiple electron transfer.

The present materials also exhibit a density change that results in a higher surface area such that the electrolyte reactants within the nickel hydroxide have better catalysis, in addition, the conductivity is improved by the formation of filamentous conductive regions that extend from areas of high conductivity immediately adjacent to the nickel current collector to the exterior of individual nickel hydroxide particles. Thus, nickel hydroxide electrodes of the present invention have increased conductivity between the active material and the nickel current collector. This is demonstrated in the thin film materials described in the Examples, below.

The disordered materials of the present invention are compositionally and/or structurally disordered. "Compositionally disordered" as used herein is specifically defined to mean that this material contains at least one compositional modifier and/or a chemical modifier. The at least one compositional modifier may be a metal, a metallic oxide, a metallic oxide alloy, a metal hydride, and/or a metal hydride alloy. Preferably, the compositional modifier is chosen from the group consisting of Al, Bi, Co, Cr, Cu, Fe, In, LaH$_3$, Mn, Ru, Sb, Sn, TiH$_2$, TiO, Zn. The chemical modifier is chosen from the group consisting of Al, Ba, Ca, Co, Cr, Cu, F, Fe, K, Li, Mg, Mn, Na, Sr, and Zn.

"Structurally disordered" as used herein is specifically defined to mean having a more conductive surface and filamentous regions of higher conductivity and multiple or mixed phases where $\alpha$, $\beta$, and $\gamma$-phase regions may exist individually or in combination. The disordered materials of the present invention contain 8 to 30 atomic percent; preferable 10 to 20 atomic percent of at least one of the compositional modifiers or chemical modifiers described above. Materials of the present invention are formed when a compositional modifier is incorporated into the material itself. These compositional modifiers tend to disrupt the formation of large crystallites which can lead to higher resistance materials. The increased disorder due to smaller crystallites tends to provide electronic conductivity not present in more crystalline forms. Further, the local disorder caused by distortions surrounding these modifiers has a similar effect. Materials of the present invention can also be formed through charge and discharge treatments, particularly pulsed charging/discharging that encourage disorder, the formation of microcracks, and a reduction in particle size.

In order to form disordered materials containing 8 to 30 atomic percent chemical and compositional modifiers according to the present invention several processing variations may be utilized including coprecipitation of any number of compositional modifiers in a chemical conversion impregnation or electrochemical impregnation process, including that of high density, spherical type materials. These active materials may be used in all types of nickel battery positive electrodes including sintered electrodes, foam type pasted electrodes and fiber type pasted electrodes. The modifiers of the present invention may be added to conversion electrolytes during impregnation, formation, or activation, or directly to the electrolyte in a sealed or vented cell.

The disordered materials of the present invention are multiphase polycrystalline materials having at least one $\gamma$-phase that contain compositional modifiers or combinations of compositional and chemical modifiers that promote the multiphase structure and the presence of $\gamma$-phase materials. These compositional modifiers are chosen from the group consisting of Al, Bi, Co, Cr, Cu, Fe, In, LaH$_3$, Mn, Ru, Sb, Sn, TiH$_2$, TiO, Zn. Preferably, at least 3 compositional modifiers are used.

As a result of their disordered structure and improved conductivity, these materials do not have distinct oxidation states such as 2+, 3+, or 4+. Rather, these materials form graded systems that pass 1.2 to 2 electrons.

The material of the present invention are also distinguished over the prior art by the non-substitutional incorporation of at least one chemical modifier around the plates of the nickel hydroxide electrode material. The phrase "non-substitutional incorporation around the plates", as used herein means the incorporation into interlamellar sites or at edges of plates. These chemical modifiers are preferably chosen from the group consisting of Al, Ba, Ca, Co, Cr, Cu, F, Fe, K, Li, Mg, Mn, Na, Sr, and Zn.

Delmas describes the transfer of 1.5 electrons in $\alpha\rightleftarrows\gamma$-phase cycling. However, this transfer is accompanied by the formation of an insulating oxide that prevents the complete discharge of the $\gamma$-phase materials Delmas describes. As a result, the transition from the $\alpha$ to $\gamma$-phase involves a transfer of 1.5 electrons. Over time, the insulating oxide layer grows and the number of electrons transferred steadily decreases. We believe that this is the cause of the rapid decline in performance observed in the prior art materials. The increased conductivity of the material of the present invention overcomes these problems.

The focus of the prior art on the crystalline aspect of nickel hydroxide positive electrode materials is particularly obvious from the extensive efforts by Delmas to form crystalline $\gamma$-phase materials. Contrary to the prior art, the nickel hydroxide positive electrode materials of the present invention are disordered materials. The use of disordered materials permits us to permanently alter the properties of the material of the present invention by engineering the local and intermediate range order. The general principals of this are discussed above and in U.S. Pat. No. 4,623,597, the contents of which are incorporated by reference. The disordered nickel hydroxide positive electrode materials of the present invention are multiphase materials having a polycrystalline $\gamma$-phase that can additionally contain at least one structure selected from the group consisting of (i) amorphous; (ii) microcrystalline; (iii) polycrystalline lacking long range compositional order with three or more $\gamma$-phases of said polycrystalline structure; and (iv) any combination of said amorphous, microcrystalline, or polycrystalline structures.

Another reason for the improved performance of the present materials is that the chemical modifiers provide for electronic overlap between adjacent nickel hydroxide plates thereby increasing the inherent conductivity of the nickel hydroxide material. This latter possibility was considered previously (see, Corrigan, et al, 90-4 Proceedings of the Symposium on Nickel Hydroxide Materials 97 (1990). However, the prior art does not teach that major gains in specific capacity can be achieved by the incorporation of chemical modifiers between plates of disordered material such that these chemical modifiers provide electronic overlap through spatially extended d-orbitals as in the present invention.

This invention also teaches methods to produce the described improved nickel hydroxide materials. According to the present invention, compositional modifiers are incorporated into the nickel hydroxide electrode material using, for example, conventional precipitation procedures. Electrolyte ions can be incorporated into the interlamellar regions, for example, during oxidation in alkaline electrolyte solution. Chemical modifiers can be incorporated into non-substitutional sites in the interlamellar regions, for example, by treatment of oxidized nickel hydroxide materials with salt solutions. The incorporation of combinations of compositional modifiers, electrolyte ions, and chemical modifiers are believed to be especially useful.

In one method of the present invention, oxidized nickel hydroxide is treated with metal nitrate salt solution and with metal hydroxides then precipitated by cathodic deposition from this nitrate solution. In another method, the oxidized nickel hydroxide is treated with metal salt solution with metal hydroxide and then precipitated by subsequent treatment with alkaline solution. Oxidized nickel hydroxide material could be prepared by electrochemical oxidation in alkaline solution or by treatment with a suitable chemical oxidant such as hydrogen peroxide or sodium hypochlorite.

The choice of disordered materials has fundamental scientific advantages: as seen, a substantial number of elements can be included in the lists of modifiers. These elements offer a variety of bonding possibilities due to the multi-directionality of d-orbitals. The multidirectionality ("porcupine effect") of d-orbitals provides for a tremendous increase in density. A considerable increase in electron transfer capacity is possible in the disordered alloys of the present invention compared to crystalline structures such as described by Delmas. The preparation of disordered alloys produces large numbers of grain boundaries and a large surface area leading to the increased conductivity and hydrogen diffusion, and subsequently, multiple electron transfer of the materials of the present invention. Thus, in addition to compositional disorder, there occurs topological disorder at phase boundaries of the multi-phase alloy. This increases enormously the density of catalytic sites.

The material of the present invention has been observed to transfer up to 1.52 electrons per atom during reversible cycling. Cycling tests currently underway indicate that multiple electron transfers remain stable throughout the life of the cell. Thus, it is expected that cells fabricated using the materials of the present invention would exhibit excellent capacity throughout their lives.

The materials of to the present invention can be prepared by first oxidizing the nickel hydroxide electrode material so that many of the nickel ions are in the 3+ state. The nickel hydroxide electrode material is then treated with a cation solution, such as by dipping, rinsing, or spraying. The treated material is then reduced, triggering the reaction shown in equation (6) (where M is a metal ion):

$$Ni^{3+}film + M^{+}solution \rightarrow Ni^{2+}film + M^{(n+1)+}film \qquad (6)$$

As a result of this reaction, chemical modifiers are nonsubstitutionally incorporated around the plates of the nickel hydroxide electrode material. This reaction can be accomplished electrochemically or chemically.

A chemical method, for example could be accomplished by placing electrode powder in an oxidizing solution, treating the oxidized powder with a cation solution, and triggering the oxidation of the treated powder using hot water. The resulting powder could then be pasted onto a foamed nickel substrate. An electrochemical method, could be accomplished by oxidizing formed nickel hydroxide material electrochemically, dipping the oxidized material in a cation solution, and using a current to trigger the oxidation reaction. Variations of these methods such as a chemical oxidation and an electrochemical reduction or a electrochemical reduction and a chemical reduction are within the scope of the present invention.

Other methods of preparing the disordered materials of the present invention are activation methods that involve a 200-300% increase in current density, a pulsed or intermittent charge/discharge treatment, or both increased current density and a pulsed treatment. Nickel hydroxide positive electrode materials produced by these methods have a capacity greater than the 289 mAh/g theoretical capacity considering only single electron transfer.

Additional improvement of the disordered material of to the present invention are possible when these disordered materials are combined with electrolytes where the electrolyte comprises at least one element chosen from the group consisting of Ba, Ca, Cs, K, Na, Ra, Rb, and Sr, combined with at least one member of the group consisting of Br, Cl, F, OH. Particular examples of such electrolytes are formulations of KOH and CsF and KOH and CsOH.

EXAMPLES

Example 1

Thin films were deposited onto nickel foils, 0.005" thick at 6 mA/cm² for 30 sec to produce a film about 300 nm thick based on the reported density of 4 g/cm³ for nickel hydroxide. A charge of 600 mC was used for deposition of the electrodes. This initial oxidation/deposition involved about 1.5 electrons per nickel atom. The oxidation proceeded to a nickel valence of around 3.6, at which point the films turned black. The electrolyte was 30% by weight KOH and 1.5% by weight LiOH.

Film 1 was deposited using nickel nitrate. Films 2 and 3 were deposited from a 0.1M solution of Ni/Co nitrate. Film 3 was treated further to create a disordered material according to the present invention.

In film 3, a first layer was deposited for 25 sec, after which the film was removed from the electrolyte, dipped in water, and oxidized in standard KOH/LiOH electrolyte. Following this pre-oxidation, film 3 was again dipped in water and repositioned in electrolyte for further deposition. Charge was applied galvanostaticaly up to a potential of approximately +0.55 V versus the Hg/HgO reference electrode, just before oxygen evolution. This charge/discharge cycling incorporated Co as a compositional modifier according to the present invention.

The precipitation of metal hydroxides in film 3 occurs as a result of nitrate reduction to ammonia as shown in equation (7):

$$NO_3^- + 7H_2O + 8e^- \rightarrow NH_4^+ + 10OH^- \qquad (7)$$

The increased pH theoretically induces the chemical precipitation of nickel hydroxide on the electrode surface as shown in equation (8):

$$Ni^{2+}/(Co^{2+}) + 2OH^- \rightarrow Ni(OH)_2/(Co(OH)_2) \qquad (8)$$

Overall Co content is indicated in Table 1. Oxidation charge values (anodic current) and reduction discharge values (cathodic current) were obtained as the product of the charging/discharging transition time multiplied by the charging/discharging current. Theoretical capacity was calculated from equations 7 and 8 and the percentage of Ni present. The number of electrons per Ni atom was calculated by dividing $Q_{discharge}$ by $Q_{theoretical}$.

TABLE 1

| film | deposited material | $Q_{theoretical}$ | $Q_{discharge}$ | electrons per Ni atom |
|---|---|---|---|---|
| 1 | 100% Ni | 375 | 350 | 1.07 |
| 2 | 10% Co, 90% Ni | 338 | 386 | 1.14 |
| 3 | 10% Co, 90% Ni (disordered film) | 338 | 513 | 1.52 |

For cells 1 and 2 The initial anodic charge is larger than subsequent charges obtained under steady state conditions ($Q_{charge}$). This is believed to result from the incomplete reduction of these films. Under steady state conditions, $Q_{charge}$ is always slightly larger than $Q_{discharge}$. The presence of cobalt in film 2 does result in some increase in discharge capacity over a pure nickel electrode. The discharge of films 1 and 2 is incomplete: only 1.07 and 1.14 electrons are transferred respectively. This was visually confirmed: films 1 and 2 remain black indicating incomplete reduction. In contrast, film 3, according to the present invention, undergoes a complete discharge involving the transfer of about 1.52 electrons. This was visually confirmed when film 3 turned clear indicating only a negligible amount of oxidized material remains and film 3 turns clear.

Example 2

Sintered nickel hydroxide electrode materials were prepared as described in copending U.S. patent application Ser. No. 07/975,031. These materials were treated using a pulsed overcharge as described below to form disordered multiphase polycrystalline γ-phase material having microcracks and reduced particle size according to the present invention.

The sintered material was immersed in 30% KOH. A current of 750 mA was passed through the electrode for 8 seconds, then a reverse current was passed through the material for 2 seconds. This process was continued for 1.5 hours, followed by a 10 minute continuous charge at 750 mA. These materials were then cycled as half cells. The gravimetric capacity of this material was 384 mAh/g (1384 c/g).

Figure 4:
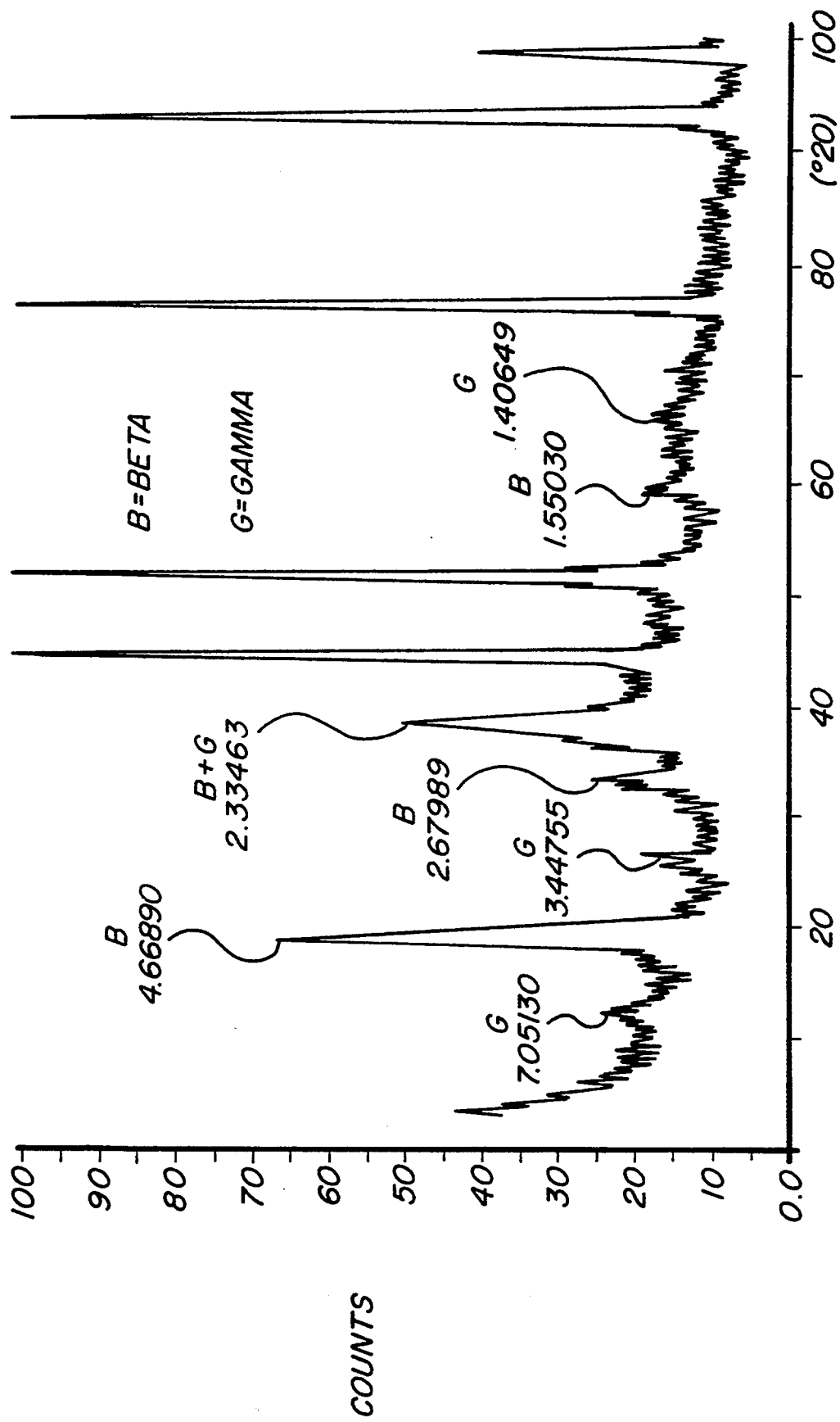
FIG. 4 is an x-ray spectra showing the presence of $\gamma$-phase material in high energy "C" cells of the present invention.

FIG. 4 shows x-ray diffraction spectra a, b, and c. Spectra a was run immediately after completion of the pulsing treatment before cycling. Spectra b was run with the material in the charged state after six cycles. Spectra c was run with the material in the discharged state after 19 cycles. A comparison of these spectra indicates that the multiphase polycrystalline γ-phase material of the present invention is stable and exhibits no tendency toward transformation into the β-phase as the prior art materials did. In addition, minimal swelling, of only about 0.002 inches on average, was observed.

Further improvements are possible when disordered electrode material according to the present invention are combined with the electrolyte formulation shown below in Table 2.

respectively, where cell C was a high energy, 5 Ah "C" cell. The details of this assembly are described in U.S. patent application Ser. No. 07/879,823, the contents of which are incorporated by reference.

Figure 5:
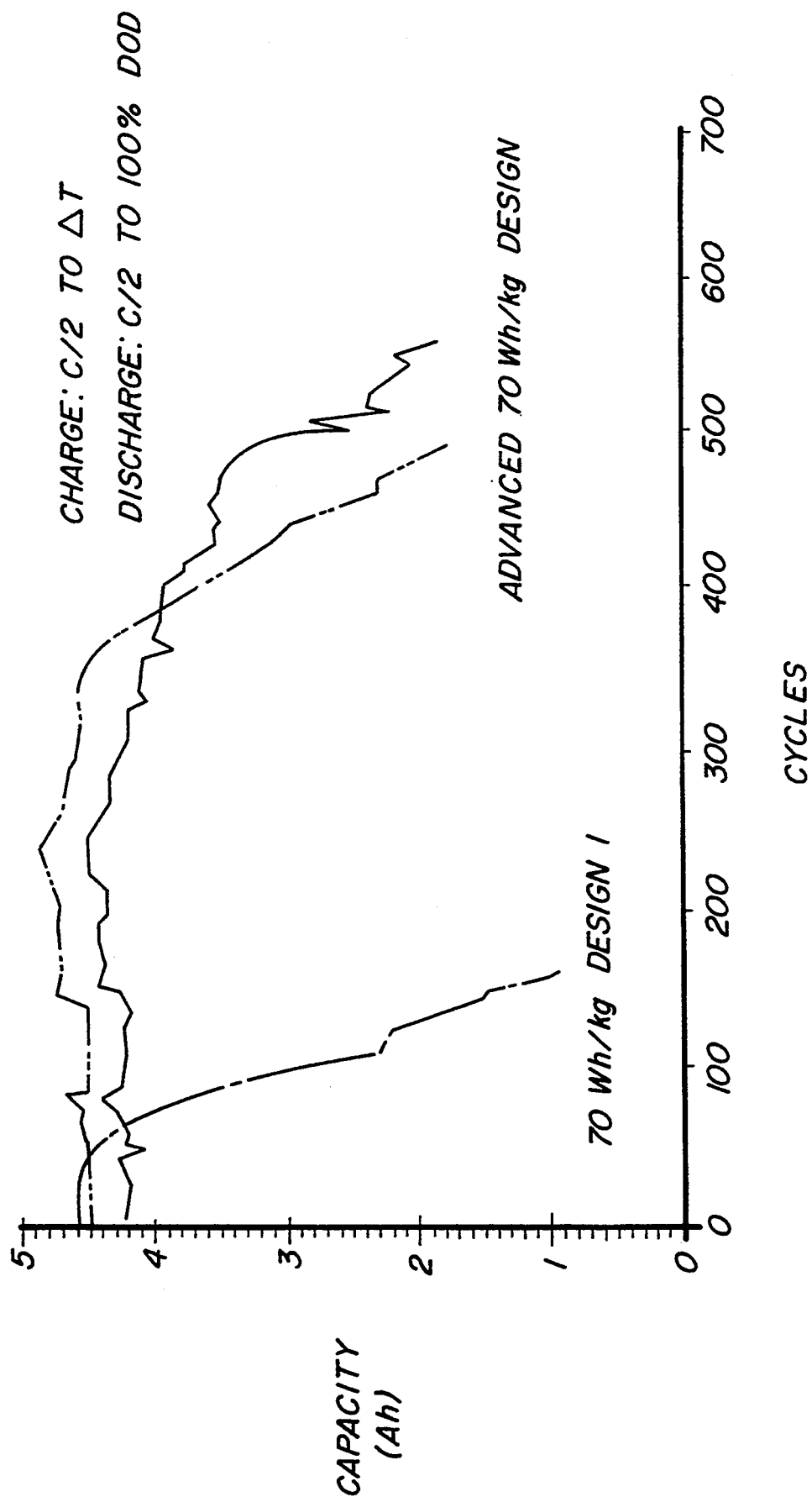
FIG. 5 shows the increased cycle life in a high energy "C" cell of the present invention.

The positive electrode materials used in these cells were analyzed using X-ray diffraction. All the cells had a multiphase structure including a polycrystalline γ-phase as shown in FIG. 5. These cells were cycled until failure (charged C/2 to ΔT and discharged C/2 to 100% DOD). As shown in FIG. 5. Cell C, according to the present invention, had a cell life of about 600 cycles.

It is obvious to those skilled in the art that the positive electrode materials of the present invention may be prepared by additional methods without departing from spirit and scope of the present invention.

The drawings, discussion, descriptions, and examples of this specification are merely illustrative of particular embodiments of the invention and are not meant as limitations upon its practice. In particular, Ni-Cd and Ni-MH cells are specifically discussed, however, the positive electrodes of the present invention can be used with any Ni based negative cell, such as NiZn and NiFe. Thus, it is the following claims, including all equivalents, that define the scope of the invention.

What is claimed is:

1. A high capacity, long cycle life positive electrode for use in an alkaline rechargeable electrochemical cell comprising:

TABLE 2

| phases<br>cycle | A<br>β-α<br><br><br>30% KOH | B<br>β<br>30% KOH<br>+ 0.1M<br>LiOH | C<br>β-α<br><br>30% KOH<br>0.1M CsF | D<br>β-α<br>30% KOH<br>0.01M<br>CsOH | E<br>β-α<br>30% KOH<br>0.1M<br>CsOH | F<br>β-α<br>30% KOH<br>0.01MCs<br>OH |
|---|---|---|---|---|---|---|
| 1 | 1227 | 1162 | 1250 | 1214 | 1247 | 1216 |
| 2 | 1328 | 1235 | 1373 | 1324 | 1349 | 1309 |
| 3 | 1370 | 1278 | 1432 | 1364 | 1400 | 1380 |
| 4 | 1395 | 1303 | 1464 | 1385 | 1430 | 1412 |
| 5 | 1417 | 1309 | 1479 | 1408 | 1456 | 1443 |
| 6 | 1428 | 1325 | 1491 | 1434 | 1481 | 1458 |
| 7 | 1441 | 1329 | 1522 | 1444 | 1495 | 1475 |
| 8 | 1456 | 1332 | 1544 | 1459 | 1511 | 1485 |
| 9 | 1474 | 1337 | 1551 | 1473 | 1518 | 1493 |
| 10 | 1489 | 1335 | 1569 | 1487 | 1535 | 1514 |
| 11 | 1499 | 1344 | 1581 | 1510 | 1541 | 1534 |

Area of samples was approximately 0.5 in². Samples were cycled with a 4.58 hr charge using a 0.060 A current and discharged to a cutoff voltage of −1.1 V. Results are presents in Coloumbs per square inch.

Example 3

A Ni-MH negative electrode material having the composition $$V_{18}Ti_{15}Zr_{18}Ni_{29}Cr_5Co_7Mn_8$$

was fabricated into negative electrodes as described in copending U.S. application Ser. No. 07/879,823 the contents of which are incorporated by reference.

Positive electrodes according to the present invention were prepared as described in Table 3, below.

TABLE 3

| positive electrode | chemical modifier(s) | compositional modifier(s) |
|---|---|---|
| A | none | Co |
| B | none | Co |
| C | Li, K, Co | Co |

The prepared negative electrodes, separator, 30% KOH electrolyte, and nickel hydroxide positive electrodes A, B, C were assembled into "C" cells A, B, C, a solid solution nickel hydroxide material having
 a multiphase structure that comprises at least one polycrystalline γ-phase including a polycrystalline γ-phase unit cell comprising spacedly disposed plates with at least one chemical modifier incorporated around said plates, said plates having a range of stable intersheet distances corresponding to a 2+ oxidation state and a 3.5+, or greater, oxidation state; and
 at least three compositional modifiers incorporated into said solid solution nickel hydroxide material to promote said multiphase structure.

2. The positive electrode claimed in claim 1, wherein one of said at least one chemical modifier is chosen from the group consisting of Al, Ba, Ca, Co, Cr, Cu, F, Fe, K, Li, Mg, Mn, Na, Sr, and Zn.

3. The positive electrode claimed in claim 1, where said at least three compositional modifiers are chosen from the group consisting of a metal, a metallic oxide, a metallic oxide alloy, a metal hydride, and a metal hydride alloy.

4. The positive electrode claimed in claim 1, where said at least three compositional modifiers are chosen from the group consisting of Al, Bi, Co, Cr, Cu, Fe, In, LaH$_3$, Mn, Ru, Sb, Sn, TiH$_2$, TiO, Zn.

5. The positive electrode claimed in claim 2, where one of said at least three compositional modifiers is chosen from the group consisting of Al, Bi, Co, Cr, Cu, Fe, In, LaH$_3$, Mn, Ru, Sb, Sn, TiH$_2$, TiO, Zn.

6. The positive electrode claimed in claim 1, where one of said at least three compositional modifiers is Co.

7. The positive electrode claimed in claim 1, where two of said at least three compositional modifiers are Co and Zn.

8. The positive electrode claimed in claim 2, wherein said at least three compositional modifiers are chosen from the group consisting of Al, Bi, Co, Cr, Cu, Fe, In, LaH$_3$, Mn, Ru, Sb, Sn, TiH$_2$, TiO, Zn.

9. The positive electrode claimed in claim 1, wherein said positive electrode material is a disordered material and has at least one structure selected from the group consisting of
 (i) amorphous;
 (ii) microcrystalline;
 (iii) polycrystalline lacking long range compositional order; and
 (iv) any combination of said amorphous, microcrystalline, or polycrystalline structures.

10. The positive electrode claimed in claim 1, wherein said positive electrode material is a structurally disordered material comprising multiple or mixed phases where $\alpha$, $\beta$, and $\gamma$-phase regions may exist individually or in combination and said positive electrode has a conductive surface and filamentous regions of higher conductivity.

11. The positive electrode claimed in claim 1, wherein said disordered materials contain 8 to 30 atomic percent of said at least three compositional modifiers or said at least one chemical modifier.

12. The positive electrode claimed in claim 1, wherein said disordered materials contain 10 to 20 atomic percent of said at least three compositional modifiers or said at least one chemical modifier.

13. The positive electrode claimed in claim 1, wherein said at least three compositional modifiers are incorporated into said nickel hydroxide material to disrupt the formation of large crystallites and provide electronic conductivity.

14. A high capacity, long cycle life nickel metal hydride cell comprising
 a positive electrode comprising a solid solution nickel hydroxide electrode material having a multiphase structure that comprises a polycrystalline $\gamma$-phase including a polycrystalline $\gamma$-phase unit cell comprising spacedly disposed plates with at least one ion chemical modifier incorporated around said plates, said plates having a range of stable intersheet distances corresponding to a 2+ oxidation state and a 3.5+, or greater, oxidation state; and at least three compositional modifiers substituted for nickel to promote said multiphase structure; and
 an electrolyte.

15. The nickel metal hydride cell of claim 14, where one of said at least one chemical modifier ion is chosen from the group consisting of Al, Ba, Ca, Co, Cr, Cu, F, Fe, K, Li, Mg, Mn, Na, Sr, and Zn.

16. The nickel metal hydride cell of claim 14, where one of said at least three compositional modifiers is chosen from the group consisting of Al, Bi, Co, Cr, Cu, Fe, In, LaH$_3$, Mn, Ru, Sb, Sn, TiH$_2$, TiO, Zn.

17. The nickel metal hydride cell of claim 14, where said at least three compositional modifiers are chosen from the group consisting of Al, Bi, Co, Cr, Cu, Fe, In, LaH$_3$, Mn, Ru, Sb, Sn, TiH$_2$, TiO, Zn.

18. The nickel metal hydride cell of claim 14, where said positive electrode material is a disordered material and has at least one structure selected from the group consisting of
 (i) amorphous;
 (ii) microcrystalline;
 (iii) polycrystalline lacking long range compositional order; and
 (iv) any combination of said amorphous, microcrystalline, or polycrystalline structures.

19. The nickel metal hydride cell of claim 14, where said positive electrode material is a structurally disordered material comprising multiple or mixed phases where $\alpha$, $\beta$, and $\gamma$-phase regions may exist individually or in combination and said positive electrode has a conductive surface and filamentous regions of higher conductivity.

20. The nickel metal hydride cell of claim 14, where said disordered materials contain 10 to 20 atomic percent of said at least three compositional modifiers or said at least one chemical modifier.

21. The nickel metal hydride cell of claim 14, where said electrolyte comprises at least one element chosen from the group consisting of Ba, Ca, Cs, K, Na, Ra, Rb, and Sr, combined with at least one member of the group consisting of Br, Cl, F, OH.

22. The nickel metal hydride cell of claim 14, where said electrolyte comprises KOH and at least one element chosen from the group consisting of CsF and CsOH.

* * * * *

UNITED STATES PATENT AND TRADEMARK OFFICE
CERTIFICATE OF CORRECTION

PATENT NO : 5,348,822

DATED : September 20, 1994

Figure 3:
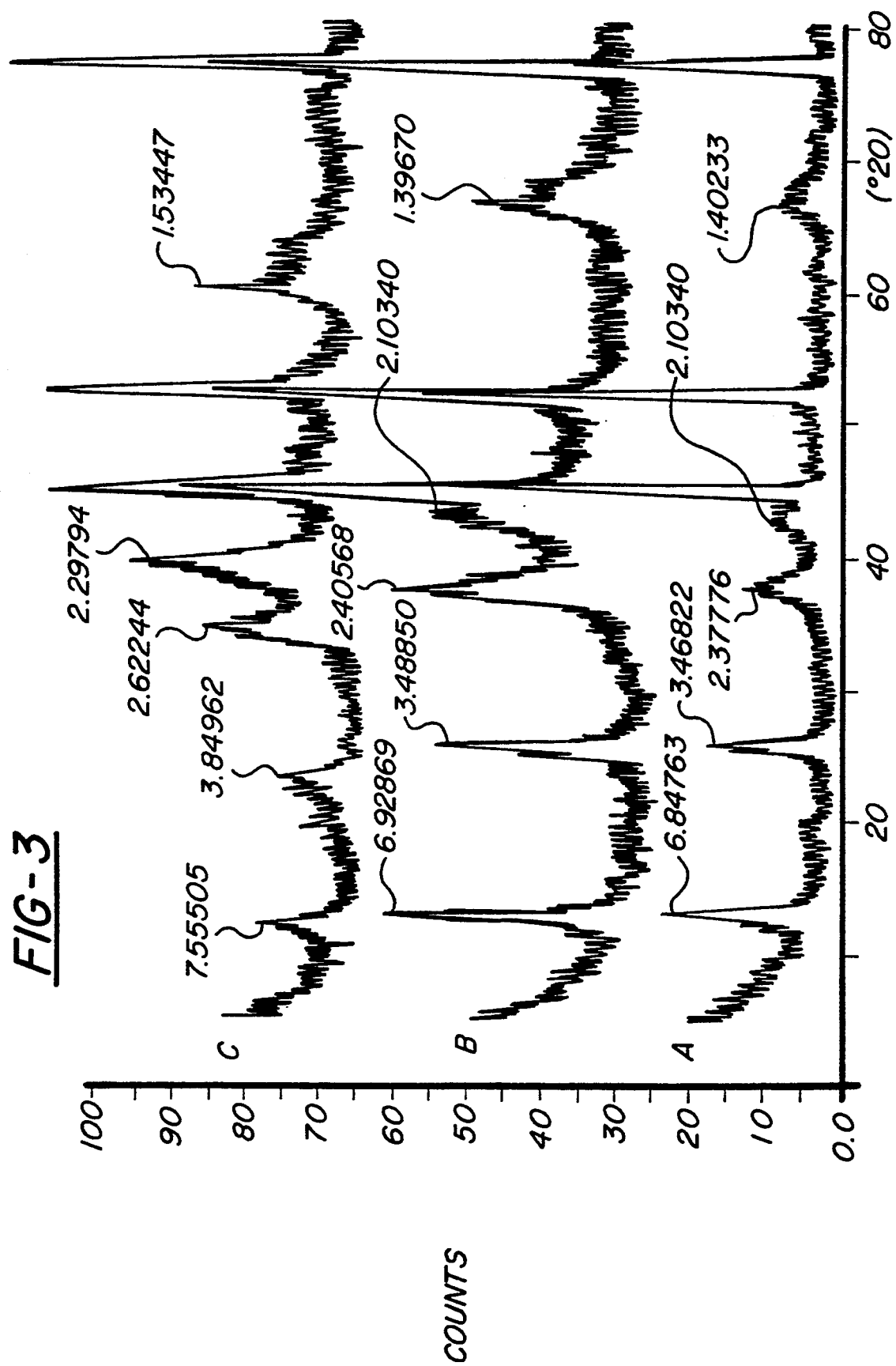
FIG. 3 is an x-ray spectra showing the stability of $\gamma$-phase materials of the present invention over time.

INVENTOR(S): Stanford R. Ovshinsky, Dennis Corrigan, Srini Venkatesan, Rosa Young, Christian Fierro, and Michael A. Fetcenko It is certified that error appears in the above-identified patent and that said Letters Patent are hereby corrected as shown below:

In column 17, line 13, change "FIG. 4" to --FIG. 3--

In column 18, line 8, change "FIG. 5" to --FIG. 4--

Signed and Sealed this

Eighth Day of May, 2001

*Attest:*

NICHOLAS P. GODICI

*Attesting Officer*  Acting Director of the United States Patent and Trademark Office